(12) United States Patent
Kesavadas et al.

(10) Patent No.: US 11,410,564 B2
(45) Date of Patent: Aug. 9, 2022

(54) SYSTEM AND METHOD FOR CREATING IMMERSIVE INTERACTIVE APPLICATION

(71) Applicant: The Board of Trustees of the University of Illinois, Urbana, IL (US)

(72) Inventors: Thenkurussi Kesavadas, Mahomet, IL (US); Naveen Kumar Sankaran, Champaign, IL (US); Steven M. LaValle, Oulu (FI)

(73) Assignee: The Board of Trustees of the University of Illinois, Urbana, IL (US)

( * ) Notice: Subject to any disclaimer, the term of this patent is extended or adjusted under 35 U.S.C. 154(b) by 703 days.

(21) Appl. No.: 16/165,212

(22) Filed: Oct. 19, 2018

(65) Prior Publication Data
US 2019/0139426 A1    May 9, 2019

Related U.S. Application Data

(60) Provisional application No. 62/582,566, filed on Nov. 7, 2017.

(51) Int. Cl.
| | |
|---|---|
| *G09B 5/02* | (2006.01) |
| *G11B 27/036* | (2006.01) |
| *H04N 5/93* | (2006.01) |
| *G06T 19/00* | (2011.01) |
| *G06F 3/01* | (2006.01) |
| *H04N 9/87* | (2006.01) |
| *G06F 3/0354* | (2013.01) |

(52) U.S. Cl.
CPC .............. *G09B 5/02* (2013.01); *G06F 3/011* (2013.01); *G06T 19/006* (2013.01); *G11B 27/036* (2013.01); *H04N 5/9305* (2013.01); *H04N 9/8715* (2013.01); *G06F 3/014* (2013.01); *G06F 3/03542* (2013.01); *G06F 3/03543* (2013.01)

(58) Field of Classification Search
None
See application file for complete search history.

(56) References Cited

U.S. PATENT DOCUMENTS

| | | | |
|---|---|---|---|
| 9,823,744 B2 | 11/2017 | Publicover et al. | |
| 2004/0125133 A1* | 7/2004 | Pea | G06F 16/40 715/751 |
| 2009/0047648 A1* | 2/2009 | Ferreira | G09B 5/06 434/323 |
| 2012/0139828 A1 | 6/2012 | Lok et al. | |
| 2013/0249948 A1* | 9/2013 | Reitan | G06T 19/006 345/633 |
| 2017/0151484 A1 | 2/2017 | Reilly et al. | |
| 2018/0098813 A1* | 4/2018 | Nesichi | A61B 34/10 |
| 2018/0261117 A1* | 9/2018 | Levinson | G09B 5/065 |

* cited by examiner

*Primary Examiner* — Justin S Lee
(74) *Attorney, Agent, or Firm* — Klintworth & Rozenblat IP LLP (57) ABSTRACT

The present disclosure provides a development system to permit a developer to generate mixed reality (MR) streaming content for display on a VR headset worn by a viewer. The system allows development and generation of the content steam by non-technical personnel, where such developers are not required to possess computer skills or engineering knowledge. The streaming content generated includes embedded pre-recorded video files originally recorded in a 360 degree format, which significantly reduces computer processing time, memory requirements, and significantly speeds up the development time required to produce a final executable streaming content.

19 Claims, 7 Drawing Sheets

SYSTEM AND METHOD FOR CREATING IMMERSIVE INTERACTIVE APPLICATION

CROSS-REFERENCE TO RELATED APPLICATIONS

This patent application claims the benefit of U.S. Provisional Patent Application Ser. No. 62/582,566, filed Nov. 7, 2017, the entire contents of which are incorporated by reference in its entirety.

BACKGROUND

Clinical education and training is a complex knowledge domain, which requires rigorous educational processes and skill development training. Conventional medical education strategies include textbook learning, didactics, practical lab sessions and workplace training. Years of didactics and continuous workplace training precede qualification for clinical practice.

Conventional medical training has the disadvantages of being expensive and time consuming. In addition, in the clinical environment, learners cannot practice at will, and the inherent convenience sampling of clinical cases may limit educational opportunities. In the apprenticeship model, the learning happens over an extended period of time and it requires several hundred cases or procedures before an acceptable level of advanced competency is reached.

It has been estimated that the cost to train American residents in operating rooms, which includes facility usage and training time, is about $53 million per year. One study of training surgical residents for basic competency in robotic surgery calculated a cost at $672,000 to train 105 residents inside an operating room using animals. However, when a simulator was used, the cost was reduced to around $125,000 for the 105 residents. This significant cost savings is one indication of how medical education can benefit from advanced simulators.

Additionally, the emergence of Virtual Reality (VR) and Augmented Reality (AR) has gained significant attention in both academics and industry. To create these VR and AR environments, the content of the scenario must be modelled using techniques similar to computer graphics used in films and other media. Development of such simulated reality scenarios using VR or AR is extremely complex, time consuming and expensive, requiring personnel having sophisticated software expertise, typically with advanced degrees in computer science or engineering. Often, each frame or scene must be designed and rendered on powerful computers. It is not uncommon for single frames of a scenario to require many hours of computer processing time.

With the current state-of-art in VR, surgeons have been trained on simulators to acquire skills to operate the robots and to improve their skills. Currently, four commercially available VR robotics simulators are often used: 1) Da Vinci Skills simulator (dVSS, by Intuitive Surgical, Sunnyvale, Calif.); 2) the Mimic dVTrainer (dV-Trainer, Mimic Technologies, Inc, Seattle, Wash.); 3) the Robotic Surgical Simulator (RoSS; Simulated Surgical Systems, Buffalo, N.Y.); and 4) SimSurgery Educational Platform (SEP, SimSurgery, Norway). These devices and systems have been validated with 26 different studies on various aspects, such as face, content, construct, concurrent, etc.

However, these VR simulator trainers focus on providing fine laparoscopic tool motion and task skills, but do not provide training on the initial robot setup before the procedure begins. The training program for robotics in surgical residency is already heterogeneous and verification requirements vary by hospitals.

Robotic assisted operations are cooperative team efforts involving numerous members, including surgeons, scrub nurses, circulating nurses, fellows, residents, and medical students. It is crucial that the surgical staff involved is well-trained well to eliminate the risk of handling the robot in a way that could endanger the patient.

Like all other complex machinery, the robot needs advanced setup and preparation in a sterile environment before the patient can even be wheeled into the operating room. Typically, the robot is first moved next to the surgery table, various arms of the robot are adjusted for a given procedure (which again depends on the procedure and the patient), and various controller settings must be set up for bringing the machine to an operational state.

In addition, surgical tools must be attached while the sterile field is maintained. The surgeon will interact closely to test the robot functionality from a master console while assistants arrange the arms to match the case that will be performed on a given day. The robot manual provides a wide range of instructions, but applying them in a team environment requires training and practicing in a real operating room set up.

Currently, neither VR nor AR can be used easily to create an extensive simulated educational or medical curriculum, especially to demonstrate clinical and surgical procedures. As discussed above, the development of such simulated reality scenarios using VR or AR is extremely complex, time consuming, and expensive, requiring personnel having sophisticated software expertise, typically with advanced degrees in computer science or engineering.

There is a need to be able to author or develop simulated environments for education and learning, especially in the medical industry, whether in a robotic theater or non-robotic theater, which can be authored by a non-expert and which is cost-effective and relatively quick.

SUMMARY

Clinical education and training is a complex knowledge domain which requires rigorous educational processes and skills. Embodiments of the present invention provide significant advantages by using a Mixed Realty (MR) scenario. Mixed Reality development represents a combination of VR and AR technologies and may be a "continuum" between VR and AR. In an MR scenario, simulated environments may have real world and virtual worlds components. MR applications or scenarios can be developed to provide immersive experiences to viewers with both real and virtual content, thereby relaxing the intense modelling and programming requirements for the authors, meaning that the MR scenario can be authored by a non-expert or one of little computer science or engineering background, and which is cost-effective and permits broader developer participation.

In one aspect, embodiments of this disclosure provide a method for generating an interactive mixed-reality content stream to simulate an educational learning environment, the content stream viewed on a display of a virtual-reality (VR) headset worn by a viewer. The method includes selecting, using a source media engine, a plurality of media files for inclusion into the content steam, wherein the plurality of media files include at least one prerecorded video file originally recorded in a 360 degree format; arranging the selected media files, using a sequencing engine, to generate an ordered sequence of the selected media files, and provide a predetermined transition between media files in the content stream; adding interactive supplemental display output, using an interaction engine, to the content stream, so that at least one of captions, text description, and quizzes are presented to a viewer during playback of the content stream to the display of the VR headset worn by the viewer, the at least one of captions, text description, and quizzes presented at predetermined times during playback of the content stream to permit the viewer to interact in real-time with the content stream. The interaction engine is configured to provide user control, so that the viewer reacts to the content stream during the playback and provides output or commands to control operation of the interactive supplemental display output during the playback of the content stream. The method further provides data collection capability, using a data collection engine, to collect data during the playback of the content stream, based on viewer interaction in response to the supplemental display output provided to the viewer during playback of the content stream, and a delivery engine packages the content stream for playback on the display of the VR headset worn by the viewer.

In another aspect, embodiments of this disclosure provide a system for developing an interactive mixed-reality training content to simulate an educational learning environment presented to a display of a virtual-reality (VR) headset worn by a viewer. The system may include a source media engine configured to permit a developer to select a plurality of media files for inclusion into a content steam, where the plurality of media files includes at least one prerecorded video file originally recorded in a 360 degree format; a sequencing engine configured to permit the developer to generate an ordered sequence of the selected media files, and provide a predetermined transition between media files in the content stream; an interaction engine configured to permit the developer to add interactive supplemental display output to the content stream so that at least one of captions, text description, and quizzes are presented to the viewer during playback of the content stream on the display of the VR headset, wherein the at least one of captions, text description, and quizzes are presented at predetermined times during playback of the content stream to permit the viewer to interact in real-time with the content stream. The interaction engine is configured to provide user control, so that the viewer reacts to the content stream during the playback of the content stream and provides output or commands to control operation of the interactive supplemental display output during the playback of the content stream. A data collection engine is configured to collect data during the playback of the content stream, based on viewer interaction in response to the supplemental display output provided to the viewer during playback of the content stream; and a delivery engine is configured to package the content stream for playback on the display of the VR headset worn by the viewer.

BRIEF DESCRIPTION OF DRAWINGS

The features, objects and advantages other than those set forth above will become more readily apparent when consideration is given to the detailed description below. Such detailed description makes reference to the following drawings, wherein.

DETAILED DESCRIPTION

Figure 1:
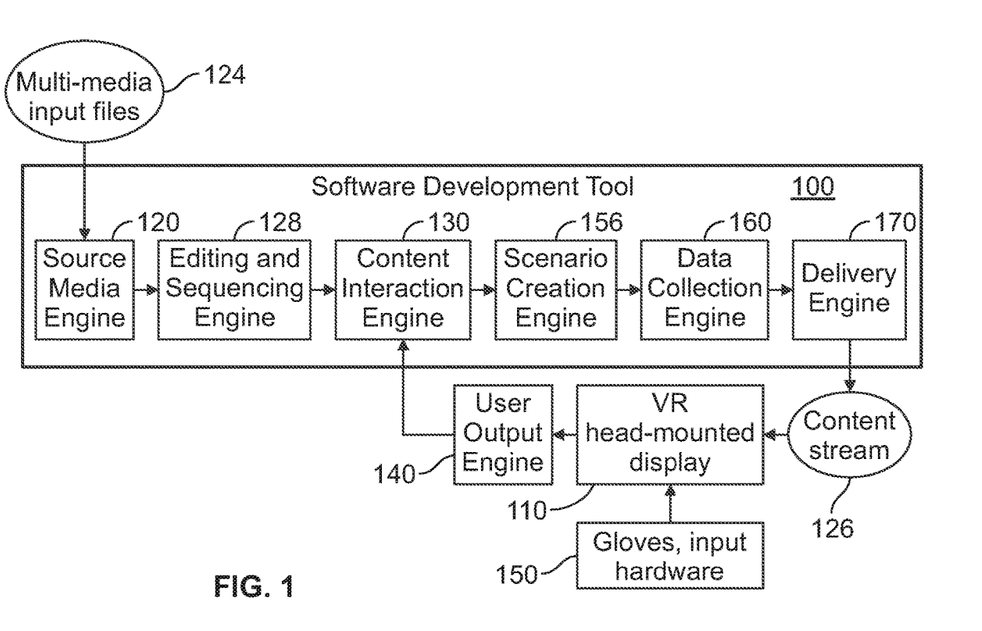
FIG. 1 is a high-level block diagram of an authoring tool for creating an immersive interactive application, according to one embodiment.

FIG. 1 shows a high-level block diagram of one embodiment of the subject invention, which provides a software development tool 100 that aids developers to create an interactive immersive multimedia application to provide content to viewers or end users. The development tool 100 is configured to provide content to peripheral hardware, such as a VR or AR head-mounted display 110. Alternatively, the development tool 100 may provide the streaming content to a cave system or other computing device to provide the viewer with a first person experience of the loaded scenario or content. A cave system (Cave Automatic Virtual Environment) an immersive virtual reality environment where projectors are directed to display content on three to six of the walls of a room-sized cube in which the user resides.

As shown in FIG. 1, the development tool 100 may include a source media engine 120, which receives a plurality of media files 124 for inclusion into a final output or content steam 126, also referred to as MR training module or application. Preferably, the plurality of media files 124 include at least one prerecorded video file originally recorded in a 360 degree format. The source media engine 120 provides output to a an editing and sequencing engine 128, which is used to arrange and generate an ordered sequence of the selected media files 124, and to create a predetermined transition between media file content in the content stream 126 so as to form an ordered sequence. This produces a simulated real-world immersive content stream displayed to the user on the head-mounted display 110.

A content interaction engine 130 generates supplemental display output, which is inserted into the content stream 126 during development of the content steam 126 so as to insert captions, text description, and interactive items, such as quizzes, all of which may be presented to the virtual-reality (VR) headset display 110 worn by the user. The captions, text description, and quizzes are presented at predetermined times during playback of the content stream 126 to permit the user to interact in real-time with the content stream.

The content interaction engine 130 also provides bi-directional interactive input/output control for the viewer so that the viewer can select and move various icons and images shown to the user during playback of the content stream 126. The viewer's selections (e.g., input to the system 100 provided by the viewer) may be provided to a viewer output engine 140, which in turn, notifies the content interaction engine 130 regarding the viewer's choices, actions, and selections made during playback of the streaming content. Based on the user's immersive experience, the viewer may activate virtual switches, use a simulated laser pointer and/or virtual mouse, and manipulate certain items shown during playback. This is facilitated by certain body-worn hardware, such as gloves 150 coupled to the VR head-mounted display 110.

The scenario creation engine 156 provides for transition inside the virtual room and virtual movement of objects in the streaming video. A data collection engine 160 provides the capability to receive and record various viewer interaction in response to the interactive supplemental display output provided to the viewer during playback of the content stream. Note that the content interaction engine 130, the data collection engine 160, and the viewer output engine 140 may have somewhat different functions depending upon whether such components are run during the authoring or development phase, meaning creation of the actual streaming content by the developer, or during the streaming content phase, meaning when the viewer receives the authored content stream using the VR head-mounted display 110 and associated hardware, such as the gloves 150.

Finally, to create the final content stream 126 (the MR training module or application) suitable for playback on the VR head-mounted display 110 (or projection equipment in the cave environment), a delivery engine 170 "packages" the content stream for such playback. Thus, the software development tool 100 may be used to create a full self-running VR experience (for example a 30 minute lecture or lab) to be run on a VR head-mounted display 110 or in the cave system. Once the scenario or content stream 126 has been created by the developer incorporating various media files 124 and other assets, the simulation may be experienced offline by one or more viewers. In that regard, a plurality of viewers in a multi-user environment may simultaneously view the content stream 126 from geographically separate locations by connecting through a server (see 1280, FIG. 12).

Figure 2:
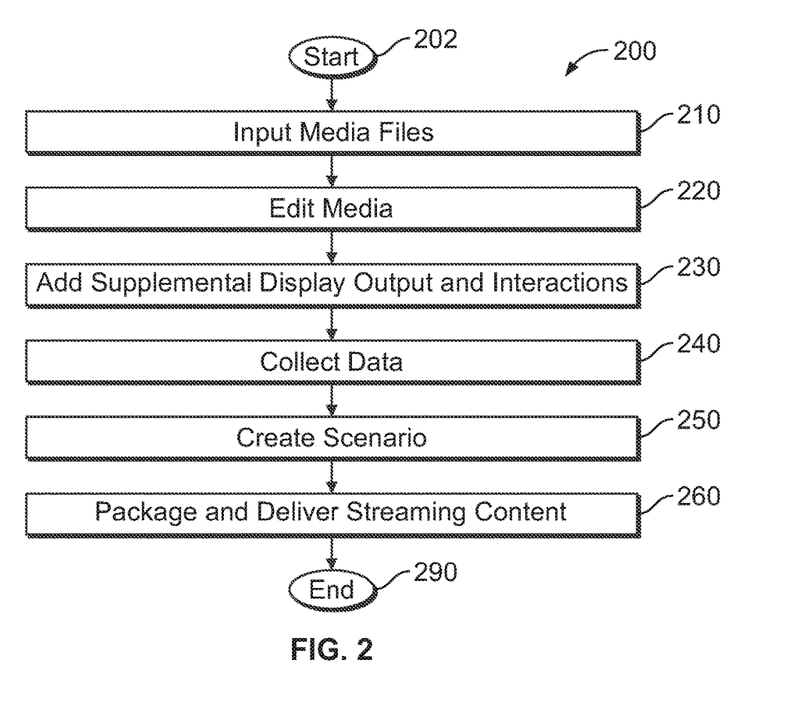
FIG. 2 is a flowchart for the authoring tool of FIG. 1, according to one embodiment.

FIG. 2 shows a high-level flowchart using some of the components or engines of FIG. 1 to author or develop a method 200 for an immersive interactive application. The method 200 begins at step 202 and the input media files are selected or input 210, preferably using the source media engine 120. The media files may then be edited 220 using the editing and sequencing engine 128. In step 230, supplemental display output and interactions are incorporated into the application or streaming content 126 using the content interaction engine 130. Next, provisions are incorporated into the application or streaming content 126 the permit data to be collected 240. This allows the actual data to be collected by the data collection engine 160 when the application is run and the streaming content is viewed by the user. At this point in the authoring or development stage, the basic portions of the content have been created 250, and the application is then packaged and delivered, meaning it is available for download to a server, processor, or the VR head-mounted display 110, for subsequent execution. The creation of the steaming content for the application then ends 290.

Advantageously, in one embodiment, the development tool 100 provides an innovative approach that instead of completely replicating the real-world scenario in VR, which requires large amount of processing power and highly skilled developers, it represents the real world in the streaming content, in part, as pre-recorded information using a 360-degree panoramic videos, which pre-recorded video may be merged with virtual content to create a mixed-reality (MR) content stream 126, to be viewed on the VR head-mounted display 100.

This pre-recorded 360-degree panoramic videos in the content stream 126 may be provided with extensive capabilities, such as: navigation within the stream content scenario, rich annotation content (text, images, video demo, 3D models, etc.), assessment tools for learning (quizzes, quiz feedback), and the like. Embodiments of the development tool 100 may be advantageously used to create medical content for novice medical professionals in specific content areas.

However, the educational and learning simulations, some of which are described herein, are not limited to the medical field, and such simulations may be quickly and inexpensively created for any learning environment, in any suitable subject area, by developers having little or no technical or programming expertise.

Another advantage of the development tool 100, in one embodiment, is the ability to enhance medical training with an MR curriculum, which can accelerate clinical exposure for novice students in the comfort of classroom or home. Pre-recorded real world scenarios along with rich annotations of content and interactions provide immersive learning experiences to the user, while reinforcing pathophysiology principles.

Certain embodiments of the development tool 100 enable developers having little or no programming knowledge to easily and quickly develop the streaming application with immersive rich content and interactions, and to communicate, teach, or entertain the viewers (end users). The development tool 100 permits the developer to design and generate applications compatible with virtual reality and augmented reality, and is agnostic to the hardware VR platform used. For example, commercially available platforms may be used to develop and run the application, such as HTC Vive (by HTC and Valve Corp.), Oculus, Samsung Gear, Google Cardboard VR, and the like.

The streaming content 126 or final run-time executable output may include a wide range of embedded scenarios resources in various format, such as: simple blank 3D space, computer animated graphic models, multimedia resources, 2D panorama images, 2D panorama videos, 3D panorama images, 3D panorama videos and the like. Also, prefabricated resources may be embedded and accessible in the content steam, such as Google Earth and Google World views, and the like. During the development stage to create the streaming content 126, the developer may use various processing engines mentioned above to add, edit, and/or remove immersive rich content portions in the streaming scenario, such as text, images, models, videos, links, and the like.

Using the editing and sequencing engine 128, the developer may edit and transform the content to set the position in 3D space of various objects, set the orientation of the objects, scale the objects, and set duration of occurrences in a scene in the streaming content 126.

Using the content interaction engine 130, the developer may annotate a portion of the scenario with text and graphics, such as pop-up menus to display immersive rich content. The developer or author in some embodiments may embed computer graphics animation models in the scenario, and may also embed multimedia resources such as audio or video in the scenario.

The developer may embed multimedia player options to permit navigation within the scenario during playback and also to navigate the contents (videos, audio) in the scenario, including transferring from one scenario to another scenario within the content stream 126.

The authoring and development tool 100 finds numerous applications, such as assisting the viewer or user to cross various levels inside the same application, or to navigate the 3D space inside the scenario. Using the content interaction engine 130, the developer may embed interactive assessment tools, which may for example, pose questions to the viewer, highlight objects for the viewer to identify, and may use natural language processing software to automatically parse verbal responses from the viewer.

Using the data collection engine 160, the developer may provide the capability to record viewer responses and to dynamically evaluate viewer response in real-time to modify scenarios or content based on the viewer response/interaction. For example, based on the response by the viewer to a particular question posed during playback of the streaming content 126, the viewer may advance to a new portion of the playback scenario, or may branch back to repeat a prior sequence if the viewer has not gained sufficient proficiency. Further, the viewer may be permitted to play different roles in the scenarios. For example, in one embodiment, the viewer may assume the role of a teacher rather than the student, or vice-versa.

The hardware environment in which the authoring and development tool 100 operates is compatible with wide variety of platforms, and may run on multiple systems, such as a computer, a server, a VR cave system, a VR head-mounted display, a AR head mounted-display, and even mobile phones. During playback of the streaming content, the content interaction engine 130 may receive input from the viewer from any viewer interface control linked to the application, including voice controlled devices, such as Amazon Echo, to control various scenarios.

Figure 3:
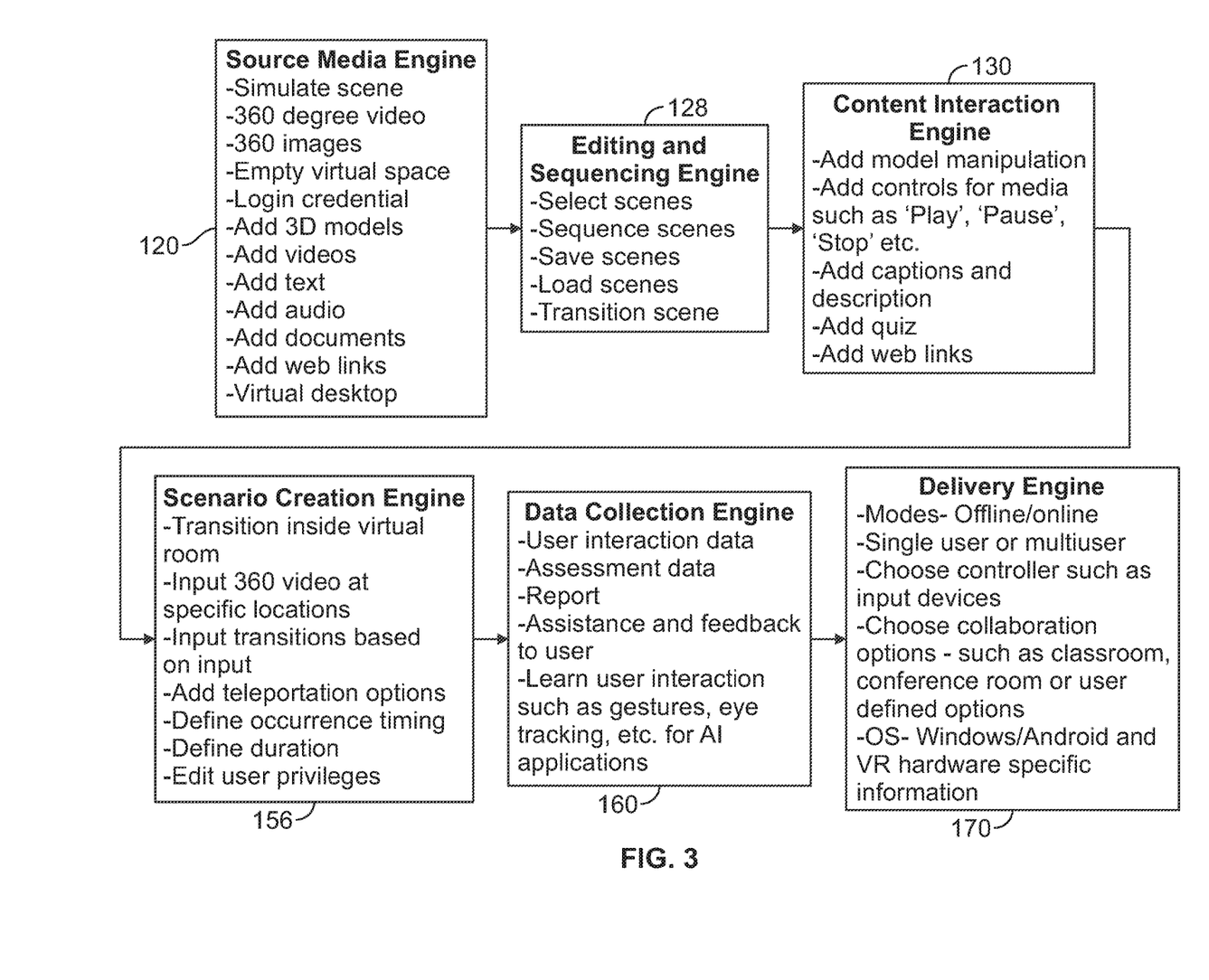
FIG. 3 is a block diagram illustrating certain features provided by the various engines shown in FIG. 1, according to one embodiment.

FIG. 3 illustrates some of the features provided by various components shown in FIG. 1. For example, the source media files 124 added by the source media engine 120 may include: simulation scene, 360 degree video, 360 images, empty virtual space, login credential, 3D models, videos, text, audio, documents, web links, and virtual desktop.

The editing and sequencing engine 128 may permit the developer to select scenes, sequence scenes, save scenes, load scenes, and transition scenes. Further, using the content interaction engine 130, the developer may add model manipulation, add controls for media such as "play," "pause," "stop" etc., add captions and description, add quizzes or other instruction, and add web links.

The scenario creation engine 156 creates the actual content by "stitching" together all of the media to be shown to the viewer during playback. The scenario creation engine 156 may provide for transition inside the virtual environment or room, input 360 degree video at specific locations in the content stream, input transitions or "jumps" based on input from the viewer, add teleportation options, define occurrences timing of scenes, define the duration of various occurrences, and edit user privileges.

The data collection engine 160 engine handles gathering, storing, managing, and manipulating of viewer interaction data, assessment data, report data, and may also provide assistance and feedback to viewer. The viewer may be provided with instructions for learning certain interactions, such as gestures, eye tracking, and the like.

The delivery engine 170 provides for various modes, such as offline mode and online mode, single user or multiuser, selection of controllers, such as input devices (physical glove, VR mouse, VR laser pointer), choice of collaboration options, such as classroom environment, conference room environment, or certain user defined options for the selected environment, and choice of operating system (OSX, Windows, Android). The delivery engine 170 also enables and facilitates recognition of the various VR hardware specific devices coupled to the system 100.

Figure 4:
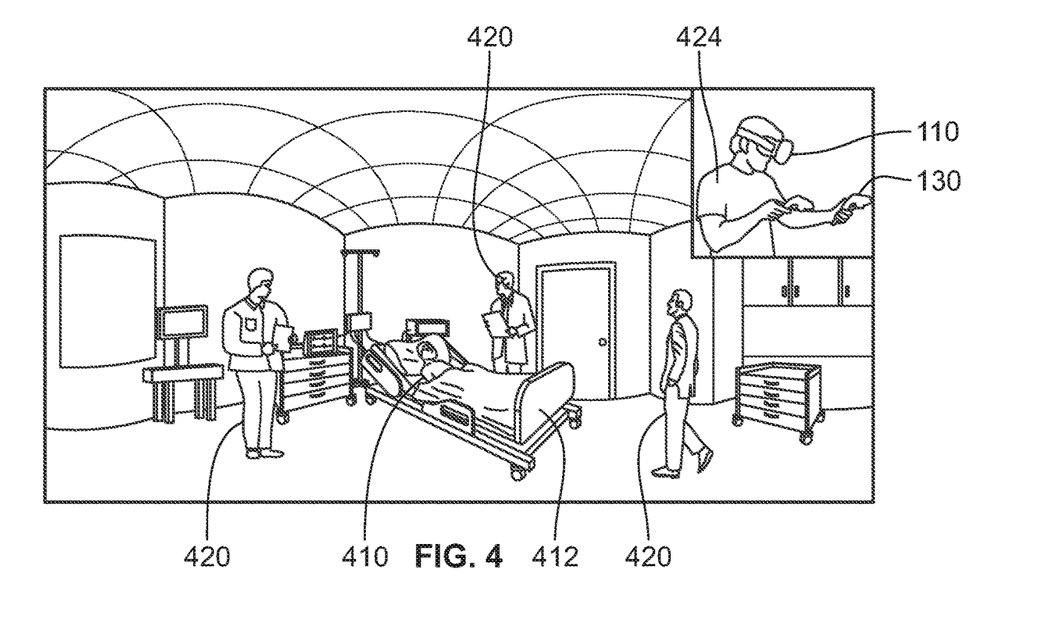
FIGS. 4-7 are still-image screen shots as seen by the viewer during playback of the streaming content, showing a hospital room and personnel in the room, according to one embodiment.

Referring now to FIG. 4, a still-frame image of a VR simulated hospital room 400 is shown, which represents one frame of a the streaming content in a specific example of a medical training application. As shown, a patient 410 is on a hospital bed 416 and a nurse, doctor, or other medical personnel 420 are standing by. The upper right corner of the image shows a separate smaller image of the viewer 424 wearing the VR head-mounted display 110 and using various input hardware or control devices, such as the VR glove 150. The viewer is essentially immersed in the VR or MR environment shown in the view of FIG. 4.

The viewer 424 may navigate inside the 3D space of the scenario, which allows the viewer 424 to move across various levels of the scenario in multiple dimensions. The system 100 permits the viewer 424 to magnify and view contents or scenario, permits the viewer 424 to enter data in the scenario in the form of writing, typing, draw, etc., and permits the viewer 424 to manipulate content (such as images, 3D models etc.) in the scenario. The viewer 424 may select components (in and on) the scenario and retrieve information, such as a tag option.

Figure 5:
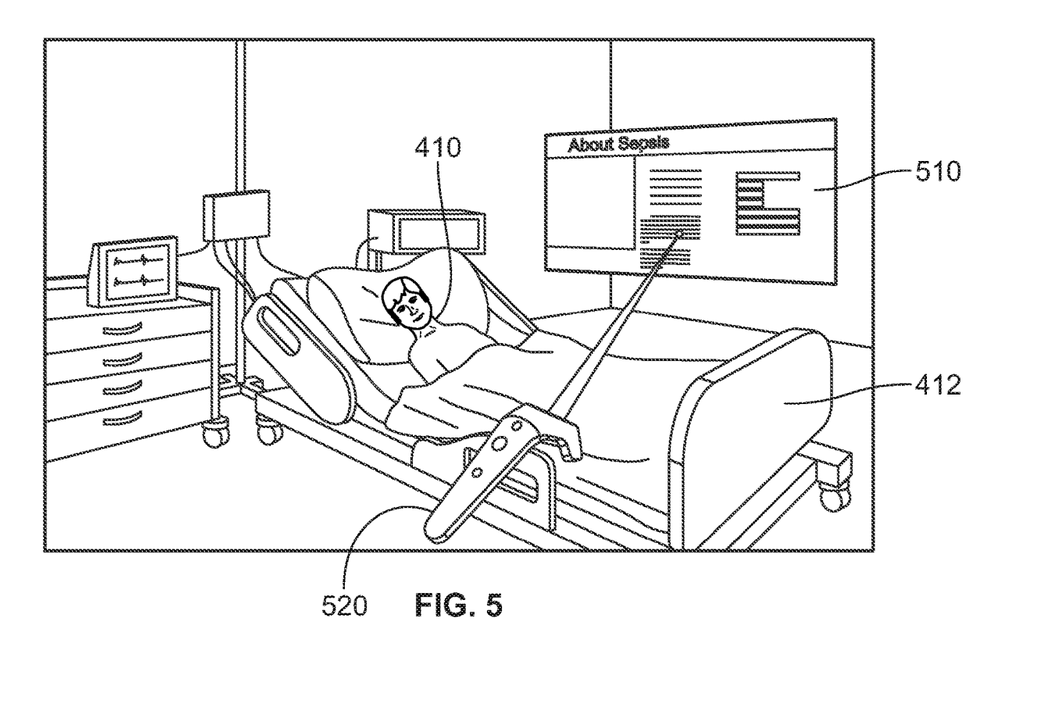

As shown in FIG. 5, the system 100 is able to display notification or informational messages and graphics 510 in the scenario to the viewer 424, and to interact with the viewer 424 in real time. The viewer 424 may interact with the messages and graphics 510 using the various input devices 150, such as a VR simulated laser pointer 520, VR mouse, and/or the viewer 424 may issue voice commends, where a natural language processing engine (not shown) can process and respond to viewer's queries or tasks. Any suitable commercially available natural language processing engine may be used, for example, Google Translate or Dragon Naturally Speaking. Further, the system 100 permits multiple viewers 424 in the scenario and to be remotely and simultaneously connected to a server based platform (see 1280, FIG. 12). Multiple simultaneous viewers may interact and exchange rich data (such as text, audio, video, 3D model interaction) via the content steam 126 displayed to each viewer's display.

Figure 6:
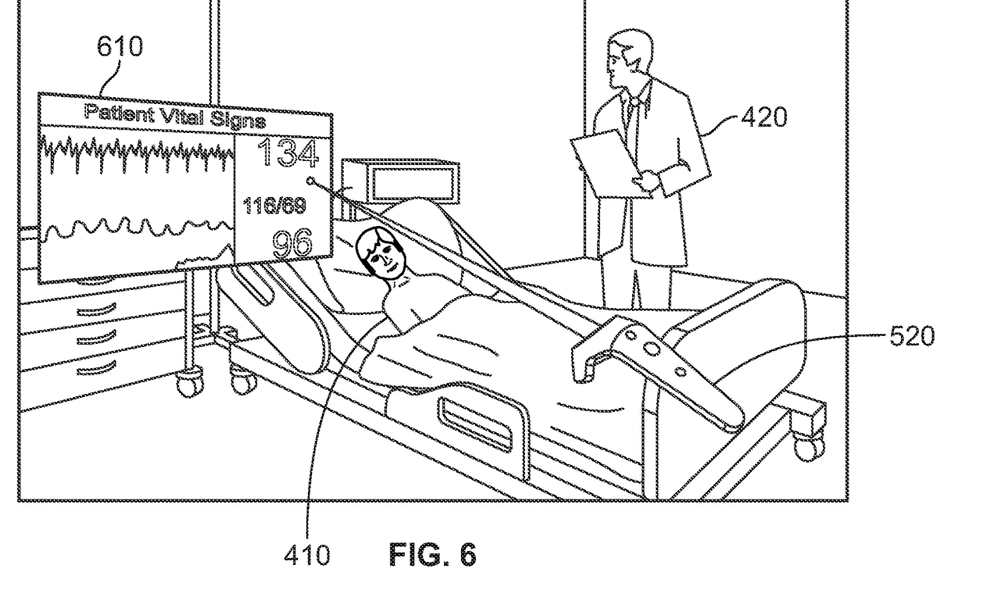
Figure 7:
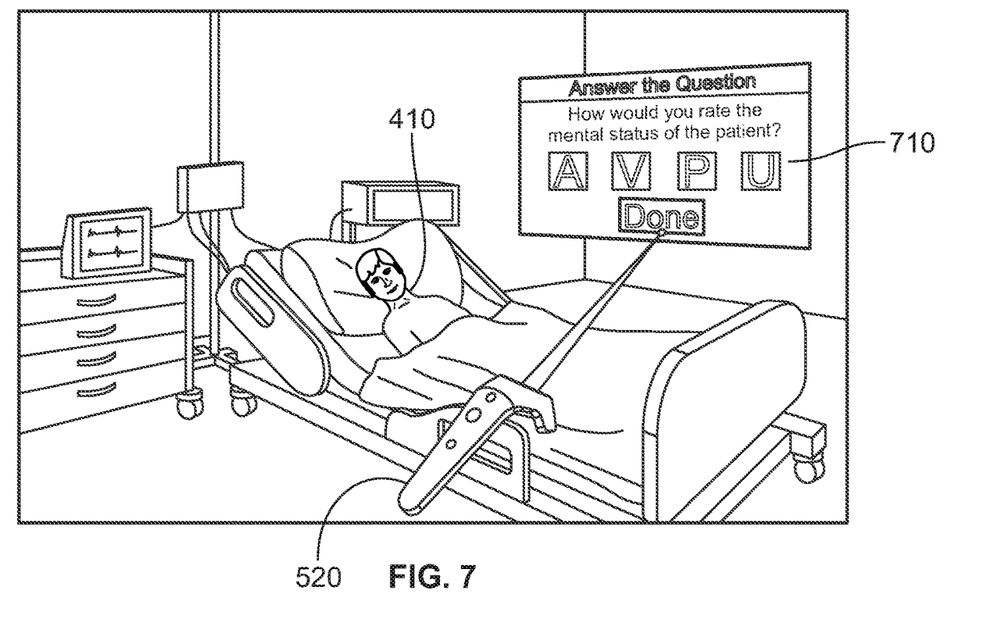

FIGS. 6-7 show additional information and graphics presented in VR to the viewer 426, such as patient vital statistics 610 (blood pressure, heart rate, etc). Also shown is a graphic 710, which asks the viewer to provide information based on the experience with respect to the patient 410, the results of which may be collected by the data collection engine 160. Embodiments of FIGS. 6 and 7 may relate to a sepsis prevention medical scenario discussed in further detail below.

Figure 8:
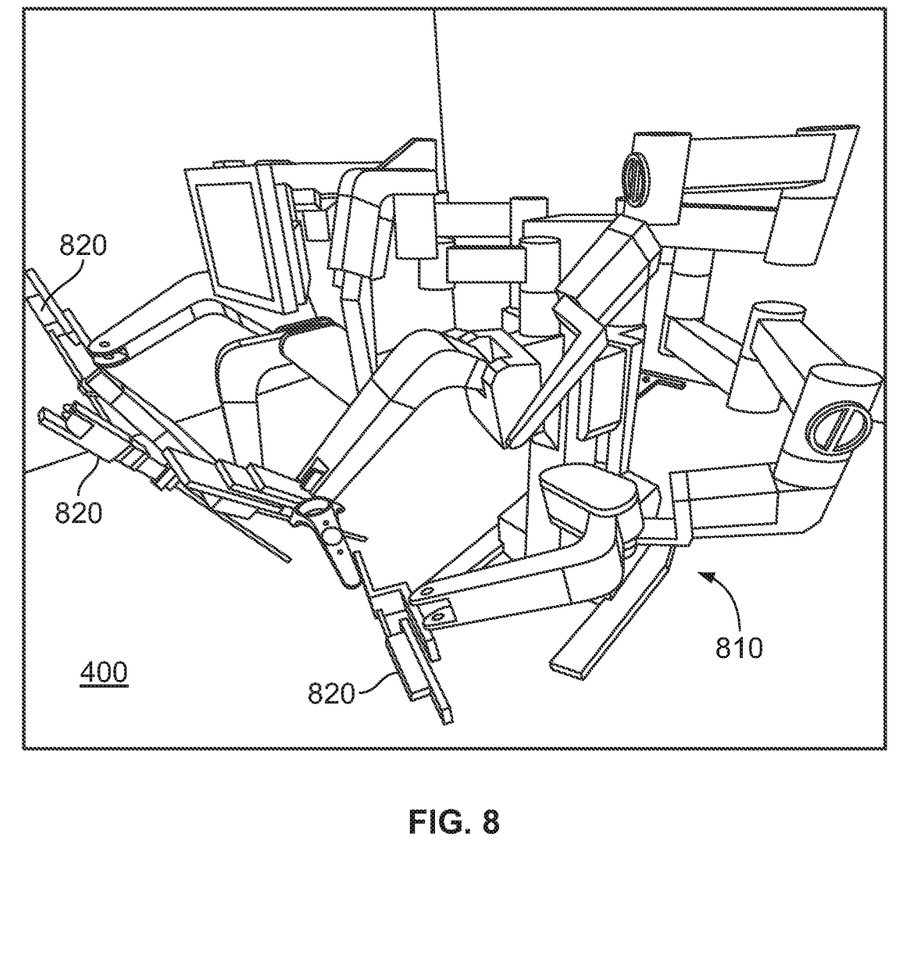
FIGS. 8-10 are still-image screen shots seen by the viewer during playback of the streaming content, showing an operating room with a robotic arm operating machine, according to one embodiment.
Figure 9:
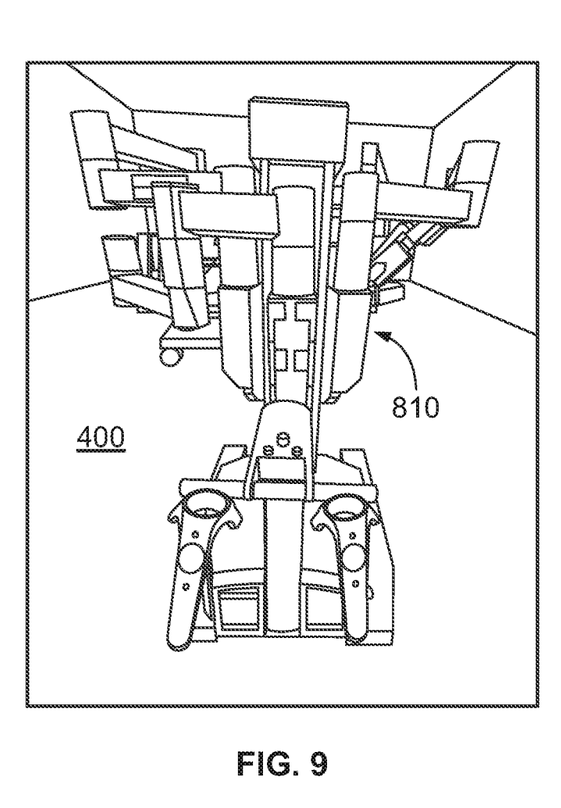
Figure 10:
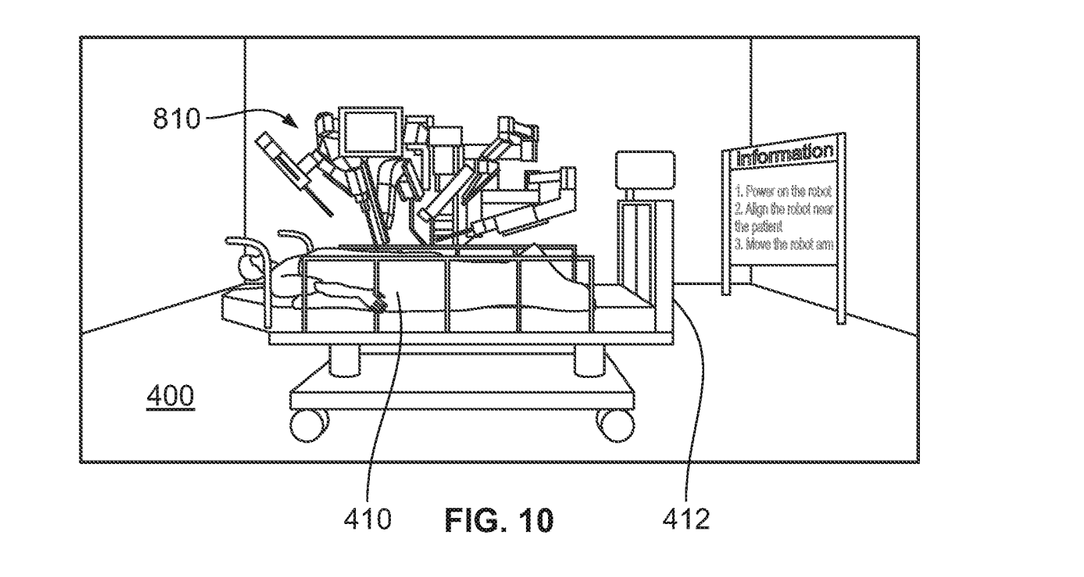

FIGS. 8-10 show still-frame images of the VR simulated hospital room 400, which represent one frame of the streaming content in a specific example of a medical training application. In particular, FIGS. 8 and 9 show views of a robot or robotic surgical simulator trainer 810 with integrated VR and MR technology to train surgical assistants. FIG. 10 shows the robot 810 positioned for operating on the patient 410. Unlike the existing VR simulators that provide fine motor skill training for surgeons using a robot, and usually provided by the robot manufacturer, embodiments of FIGS. 8-10 focus on providing coarse robot manipulation, initial skills, and setup skills, essential to beginning the operation on a patient.

With respect to the robotic scenario of FIGS. 8-10, training a surgical assistant requires understanding the components of the surgical robot 810 and the associated functionalities, usability, precautions, and limitations. Similar to conventional surgery, robotic surgery also requires the maintenance of a strict sterilized field environment (to prevent infection). Thus, the surgical assistant must be trained with regard to handling the robot 810 and the associated instruments. In the sterile environment, the robot 810 is configured near the patient 410 by the surgeons and medical staff. The robot setup procedure may vary based on many parameters, such as patient anatomy, procedure, surgical location, and access direction. The surgeon usually decides upon this during the surgical planning stage with patient history and medical imaging of the surgical location. In addition to the staff's training and verbal briefing, embodiments of the present invention provide a low-cost training platform that provides practice scenarios for multiple procedures and a platform for surgical planning and teamwork management.

In one embodiment, the simulation application or streaming content 126 generated using the development tool 100 addresses the training requirements identified above to deliver an effective learning curriculum for surgical assistants. The VR or MR streaming content simulation presents the viewer 424 with simulated models of the virtual operating room (OR) 400, the patient 410, and the robot 810, which in example, may be a da Vinci surgical robot discussed herein. A dynamic audio responder may be integrated into the VR headset 110 to provide verbal instructions to the viewer 424. The viewer 424 is then given feedback for accomplishing the task based on the task status.

In the specific example of FIGS. 8-10, the learning components in the VR streaming content (also referred to as streaming content 126) focus on training the viewer 424 with the robot functionality, usability, manipulation, and robotic arm configuration. The viewer 424 can interact with the robot 810 and perform the task with the robot by following instructions and practicing constantly. The instructions provided can be adjusted for procedure specific training content.

The MR training module (streaming content 126) is developed in a particularly efficient and economical way by the developer due to inclusion of the pre-recorded 360-degree video embedded in the content, which obviates the need for a developer skilled in programming, computer science, and/or engineering, and also significantly reduces the computer processing power require to render the streaming content, while vastly reducing the time required to develop the final product.

Note that as shown in FIGS. 4 and 6, the operating room 400 has multiple surgical staff members 420 performing tasks in various regions of the room 400. In order to provide a complete overview of every task, the 360-degree pre-recorded video is preferred over a normal video (limited field of view). Prior to inclusion in the content stream 126, the 360-degree video was preferably recorded along with corresponding audio for viewer instruction in a real operating room with an expert surgeon demonstrating various operating room preparation steps and certain da Vinci robot initiation sequences (for simulations using the da Vinci robot). The MR module (streaming content 126) provides an opportunity for the viewer 424 to observe multiple real procedure scenarios in 360 degrees of view. In the embodiments of FIGS. 8-10, the pre-recorded embedded videos present surgical sterile field preparation steps, robot positioning adjacent to the patient, and troubleshooting.

The development tool or system 100 may be developed using commercially available Unity software with formal learning objectives in VR and MR modules, which is available from Unity Technologies, the developer of video game engines. The VR headset 110 may be a HTV Vive, Oculus Rift, Oculus Quest, Oculus Go, Samsung Gear head-mounted VR system, or any other suitable VR headset display system (or cave-system projection system).

In one embodiment, a VR robot 810 is provided with various robot controller mechanisms 820 to simulate a real-world operating robot, which control mechanisms control the robot arms, endoscopic tools, cutting tools, and the like, included in the real robot. Various buttons of the robot controller mechanism may be programmed to provide different interactions (grab, teleport, manipulate, etc.). An training orientation module may be included in the content stream to teach the trainees how to use the controller or glove 150.

The viewer 424 may interact with the robot model 810 using the robot controller mechanism 820, which provides haptic feedback to the viewer. In that regard, FIG. 10 shows a first-person user view of the operating room 400, the patient 410, and the surgical robot 810. FIGS. 8 and 9 show the viewer performing the robot manipulation task, such as aligning the robot 810 near the patient bed 412 and the robot arm configuration-setting task (aligning the robot arm).

As discussed above, the developer may use the development tool 100 to generate any VR simulation, and is not limited to a robotic arm application, nor to a medical environment. For example, a VR simulation may even be directed to installing drywall in a home construction project, if desired.

In the embodiments of FIGS. 4-7, the streaming content 126 may be generated to teach procedural aspects of a medical training environment, such as sepsis management, which is a procedural application, discussed briefly above. Sepsis is a medical condition that results from the human body's inflammatory response to infection, which can lead to tremendous physiological derangement. Sepsis is a very common condition and almost one million cases are recorded every year in the United States alone. Without prompt diagnosis and treatment, the condition can rapidly develop to septic shock, organ failure and death. Should sepsis progress to septic shock, patients become highly dependent on intensive care and continuous medical support. Thus, training for novice medical professionals is foundational to create awareness about sepsis in hospital and clinical environment.

Understanding the components of a sepsis case is important for developing an effective MR streaming content (module). The fundamental phases of tasks involved in emergency situations are situational assessment, decision making, task selections and sequencing, followed by task activities. Addressing these fundamental tasks guides the proper structure for MR scenarios 126 (streaming content) addressing emergency medicine cases, such as sepsis. Thus, the developer of the MR streaming content 126 is preferably well-versed in the medical field, but as mentioned above, need not have any programming or engineering expertise.

As mentioned above, embodiments of FIGS. 4-7 present a sepsis scenario. When an emergency case presents to the care team, immediate attention and response is required to address derangements in the patient's physiology. In the clinical setting, this may occur in the setting of extreme cognitive demand and it is crucial for staff to assess the patient's condition in a speedy and accurate manner. This begins with understanding the briefing from paramedics or nurses followed by examination of patient's status 610. Embodiments of the streaming content 126 generated by the development tool 100 provide simulated training content for novice, that is immersive, engaging and cognitively demanding, similar to actual hospital environment. The VR streaming content 126 presented to the viewer 424 contains realistic scenarios that ensure learning and participation required for situational assessment based on clinical knowledge.

Explicit teaching of knowledge and skills required for medical decision making is taught to students using the VR streaming content directed to the specific medical application. An expert medical staff's decision-making skills are the result of complex thought processes, which are difficult to elaborately explain during the actual clinical event, as the patient demands immediate attention. For example, the expert's decision to administrate a drug to the patient is an outcome of the analysis of the patient's vital signs, medical history, and an understanding of drug responses and side-effects. This complex information processing in the expert's mind involves recollecting, understanding, and analyzing and is effectively presented to the novice during training using the appropriately selected VR streaming content 126. In this specific example, the streaming content 126 presented to the viewer provides annotations for discussion of the complex thought processes and decision leading to the correct outcomes.

Using the generated training module or streaming content 126, students may learn task activities, including knowledge behind the task, procedures involved in the task, and sensorimotor skills required to perform the task. For example, such activities for sepsis scenarios are identified as intravenous access, culture sample collection, and cleaning and drilling required for intravenous access.

Figure 11:
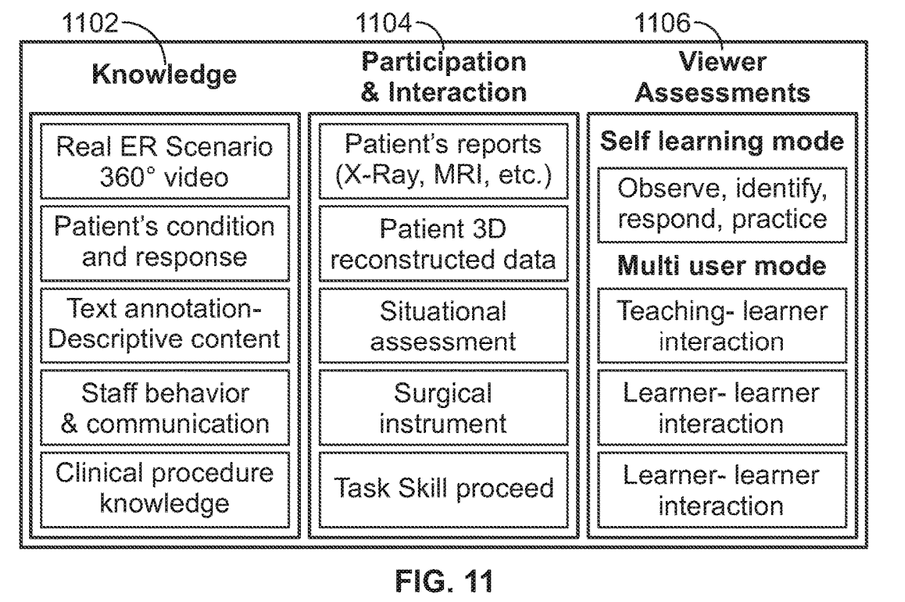
FIG. 11 is a chart showing primary knowledge components of one embodiment of a MR scenario in a hospital operating room setting.

To develop an effective sepsis training curriculum, for example, a VR scenario generated by the development tool 100, it is important to address the challenges identified above. In one example, various components of such a VR scenario are shown in FIG. 11 in greater detail. FIG. 11 shows the primary components as knowledge 1102, participation and interaction 1104, and viewer assessment. 1106. These primary components provide situational awareness in the streaming content, which ensures accurate representation of real-world scenario without complicating the curriculum development itself. These challenges are addressed by use of the embedded pre-recorded 360-degree video of an expert clinician responding to real reenacted emergency room (ER) sepsis case, for example. Use of the pre-recorded real world 360-degree video in the content stream 126 simplifies the curriculum development by eliminating the need to model graphical representation of fine details in the ER. Moreover, the viewer is provided with a first person view, ensuring immersion inside the ER. Thus, situational awareness training is provided by presenting the pre-recorded video during playback of the streaming content 126.

Note that the knowledge components 1102 of FIG. 11 provided in the streaming content 126 are provided, in part, by rich annotation content (text, images, 3D models, videos, etc.) of standard learning material overlaid on top of playback video. Additionally, this feature also facilitates annotations of staff's complex thought and decision making process. During development of the scenario using the development tool 100, the developer may select and provide the rich visual content for elaborate discussions about treatment and expected outcomes.

As set forth above, the viewer experience is interactive and may participate during playback of the streaming content 126. The viewer is provided with goal-driven activities, presented with engaging questions, and given timely feedback at appropriate stages of the scenario, as determined by the clinical context. Such features are generated in development stage using the content interaction engine 130 (FIG. 1). Examples of certain interactive content provided to the viewer in the streaming content 126 may include patient reports, patient physiological data including imaging and electronic medical reports, medical device user interfaces, and the like. Additionally, in some embodiments, the viewer may be required to perform task sequencing for the given task in the scenario, and may be assessed based on responses to questions, which may be facilitated by the data collection engine 160 (FIG. 1).

The training module or streaming content 126 generated by the development tool 100 provides a VR curriculum for serious training, and may be generated by the developer to provide both self-learning and multi-user modes. In the self-learning mode, the viewer 424 may be guided and assessed during playback of the streaming content 126 developed for the particular application at hand. In the multi-user mode, the curricula may be developed to accommodate multiple users who can participate in the scenario simultaneously to facilitate live interactions with instructors and simulation technicians. Such simultaneous participation may occur even though the multiple viewers are located remotely.

The development tool 100 system may be embodied as a system cooperating with computer hardware components and/or as computer-implemented methods. The development tool 100 may include a plurality of software modules or subsystems. The modules or subsystems, such as the source media engine, 120, the editing and sequencing engine 128, the content interaction engine 130, the scenario creation engine 156, the data collection engine 160 and the delivery engine 170, may be implemented in hardware, software, firmware, or any combination of hardware, software, and firmware, and may or may not reside within a single physical or logical space.

For example, the modules or various engines referred to in this document and which may or may not be shown in the drawings, may be remotely located from each other and may be coupled by a communication network. Additionally, the order in which the steps of the method are executed are not necessarily in the same order as shown in the drawings, and some steps may be performed in a different order than is shown in the drawings without departing from the scope of spirit of the invention.

Figure 12:
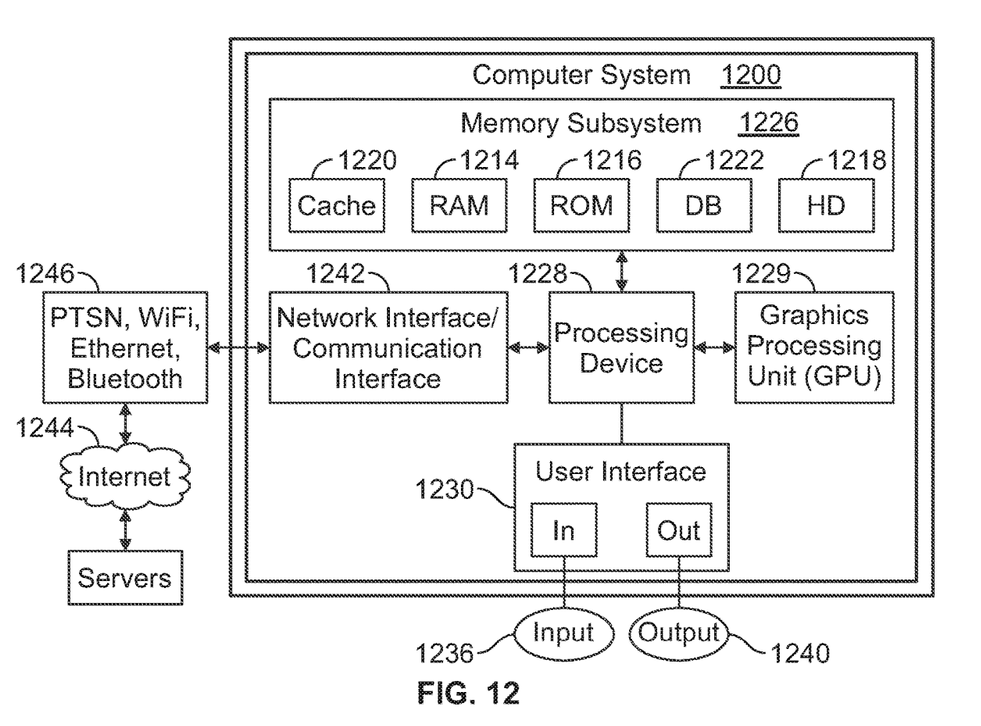
FIG. 12 is a high-level hardware block diagram of a computing system or server, which may be representative of the MR/VR system, the VR headset, or the server used to generate the provide streaming content and/or provide the streaming content to one or more viewers.

FIG. 12 is a high-level hardware block diagram of one embodiment of a computer system 1200 used to perform the methods discussed herein. The computer system 1200 of FIG. 12 may be representative of the computer system or processing configuration found in the VR headset 110 worn by the user, and may also be representative of the actual computer system used by the development tool 100 to create the streaming content. The computer system 1200 may be embodied as a system cooperating with computer hardware components and/or as computer-implemented methods. The modules or subsystems may be implemented in hardware, software, firmware, or any combination of hardware, software, and firmware, and may or may not reside within a single physical or logical space. For example, the modules or subsystems referred to in this document and which may or may not be shown in the drawings, may be remotely located from each other and may be coupled by a communication network.

The computer system 1200 may be a personal computer, a server, or any other suitable computing platform, and may include various hardware components, such as RAM 1214, ROM 1216, hard disk storage 1218, cache memory 1220, database storage 1222, and the like (also referred to as "memory subsystem 1226"). The computer system 1200 may include any suitable processing device 1228, such as a computer, microprocessor, RISC processor (reduced instruction set computer), CISC processor (complex instruction set computer), mainframe computer, work station, single-chip computer, distributed processor, server, controller, microcontroller, discrete logic computer, and the like, as is known in the art. For example, the processing device 1228 may be an Intel Pentium® microprocessor, x86 compatible microprocessor, or equivalent device, and may be incorporated into a server, a personal computer, or any suitable computing platform. A graphics processing unit (GPU) 1229, such as those commercially available from Nividia or Advanced Micro Devices, may be used in addition to or instead of the processing device 1228, and a plurality of GPU's may be used depending upon the processing capabilities required for the application.

The memory subsystem 1226 may include any suitable storage components, such as RAM, EPROM (electrically programmable ROM), flash memory, dynamic memory, static memory, FIFO (first-in, first-out) memory, LIFO (last-in, first-out) memory, circular memory, semiconductor memory, bubble memory, buffer memory, disk memory, optical memory, cache memory, and the like. Any suitable form of memory may be used, whether fixed storage on a magnetic medium, storage in a semiconductor device, or remote storage accessible through a communication link. A user or system interface 1230 may be coupled to the computer system 1200 and may include various input devices 1236, such as switches selectable by the system manager and/or a keyboard. The user interface also may include suitable output devices 1240, such as an LCD display, a CRT, various LED indicators, a printer, and/or a speech output device, as is known in the art.

To facilitate communication between the computer 1200 and external sources, a communication interface 1242 may be operatively coupled to the computer system 1200. The communication interface 1242 may couple with a local area network, such as an Ethernet network, intranet, internet 1244, or other suitable network. The communication interface 1242 may also be connected to the internet 544 or other network using public switched telephone network (PSTN), POTS (plain old telephone system), WiFi, Bluetooth, and the like, which may facilitate communication via the internet 1244. Any suitable commercially-available communication device or network may be used.

The logic, circuitry, and processing described above may be encoded or stored in a machine-readable or computer-readable medium such as a compact disc read only memory (CDROM), magnetic or optical disk, flash memory, random access memory (RAM) or read only memory (ROM), erasable programmable read only memory (EPROM) or other machine-readable medium as, for examples, instructions for execution by a processor, controller, or other processing device.

The medium may be implemented as any device that contains, stores, communicates, propagates, or transports executable instructions for use by or in connection with an instruction executable system, apparatus, or device. Alternatively or additionally, the logic may be implemented as analog or digital logic using hardware, such as one or more integrated circuits, or one or more processors executing instructions; or in software in an application programming interface (API) or in a Dynamic Link Library (DLL), functions available in a shared memory or defined as local or remote procedure calls; or as a combination of hardware and software.

In other implementations, the logic may be represented in a signal or a propagated-signal medium. For example, the instructions that implement the logic of any given program may take the form of an electronic, magnetic, optical, electromagnetic, infrared, or other type of signal. The systems described above may receive such a signal at a communication interface, such as an optical fiber interface, antenna, or other analog or digital signal interface, recover the instructions from the signal, store them in a machine-readable memory, and/or execute them with a processor.

The systems may include additional or different logic and may be implemented in many different ways. A processor may be implemented as a controller, microprocessor, microcontroller, application specific integrated circuit (ASIC), discrete logic, or a combination of other types of circuits or logic. Similarly, memories may be DRAM, SRAM, Flash, or other types of memory. Parameters (e.g., conditions and thresholds) and other data structures may be separately stored and managed, may be incorporated into a single memory or database, or may be logically and physically organized in many different ways. Programs and instructions may be parts of a single program, separate programs, or distributed across several memories and processors.

Unless defined otherwise, all technical and scientific terms used herein have the same meaning as commonly understood by one of skill in the art to which the invention pertains. Although any methods and materials similar to or equivalent to those described herein can be used in the practice or testing of the present invention, the preferred methods and materials are described herein While the present invention is susceptible to various modifications and alternative forms, exemplary embodiments thereof are shown by way of example in the drawings and are herein described in detail. It should be understood, however, that the description of exemplary embodiments is not intended to limit the invention to the particular forms disclosed, but on the contrary, the intention is to cover all modifications, equivalents and alternatives falling within the spirit and scope of the invention as defined by the embodiments above and the claims below. Reference should therefore be made to the embodiments above and claims below for interpreting the scope of the invention.

What is claimed is:

1. A system for developing an interactive mixed-reality training content to simulate an educational learning environment presented to a display of a virtual-reality (VR) headset worn by a viewer, the system comprising:
 a source media engine configured to permit a developer, during an authoring phase, to author content in real time, including selecting a plurality of media files for inclusion into a content steam, wherein the plurality of media files includes at least one prerecorded video file originally recorded in a 360 degree format, at least one virtual reality scenario, and real time streaming content, wherein inclusion of the prerecorded 360 degree format video file significantly reduces computer processing power required to render the training content;
 a sequencing engine configured to permit the developer to generate, during the authoring phase, an ordered sequence of at least portions of the selected media files, and provide a predetermined transition between the at least portions of the selected media files in the content stream;

an interaction engine configured to permit the developer to add, during the authoring phase, interactive supplemental display output to the content stream so that captions, text description, and quizzes are presented to the viewer during playback of the content stream on the display of the VR headset, wherein the captions, text description, and quizzes are presented at predetermined times during playback of the content stream to permit the viewer to interact in real-time with the content stream;

the interaction engine configured to provide bidirectional user control, so that the viewer reacts to the content stream during the playback of the content stream in a streaming content phase, the viewer reacting including interacting with at least one virtual object depicted in the content stream, and provides output or commands to control operation of the interactive supplemental display output during the playback of the content stream;

a data collection engine configured to collect data during the playback of the content stream in the streaming content phase, based on viewer interaction in response to the supplemental display output provided to the viewer during playback of the content stream; and a delivery engine configured to package the content stream for playback, in the content streaming phase, on the display of the VR headset worn by the viewer.

2. The system according to claim 1, wherein inclusion in the content stream of the at least one prerecorded video file reduces computer processing time when creating the content stream.

3. The system according to claim 1, wherein a plurality of prerecorded video files originally recorded in a 360 degree are concatenated together along with a plurality of embedded multimedia files to form the content stream, wherein selected embedded multimedia files present captions, text description, and quizzes to the user during playback of the content stream on the display of the VR headset worn by the viewer.

4. The system according to claim 1, wherein inclusion of the prerecorded video files in the content stream reduces computer processing time required to render the content stream suitable for playback on the display of the VR headset.

5. The system according to claim 3, wherein multimedia files include at least one of a video clip, power point presentation, animation, image file, text file, and spreadsheet file.

6. The system according to claim 1, including a server configured to simultaneously present the content stream the VR headset display of a plurality of viewers, and wherein the viewers are located remotely in separate geographical areas.

7. The system according to claim 1, including at least one input device that permits the viewer to select and control objects displayed to the viewer on the display of the VR headset during playback of the content stream.

8. The system according to claim 7, wherein the at least one input device includes at least one of a VR glove, a VR laser pointer, a custom VR device designed for a specific task, and a VR mouse.

9. The system according to claim 1, wherein the data collection engine generates a report that indicates a level of competency by the viewer with respect to the educational learning environment and the content stream presented to the viewer.

10. The system according to claim 1, wherein the educational learning environment is a medical environment directed to medical technicians, medical students, and medical doctors.

11. A method for generating an interactive mixed-reality content stream to simulate an educational learning environment, the content stream viewed on a display of a virtual-reality (VR) headset worn by a viewer, the method comprising:

selecting during an authoring phase in real time, using a source media engine, a plurality of media files for inclusion into the content steam, wherein the plurality of media files include at least one prerecorded video file originally recorded in a 360 degree format, virtual reality scenarios, and real time streaming content;

arranging the selected media files during an authoring phase, using a sequencing engine, to generate an ordered sequence of the selected media files, and provide a predetermined transition between media files in the content stream;

adding interactive supplemental display output during an authoring phase, using an interaction engine, to the content stream, so that captions, text description, and quizzes are presented to a viewer during playback of the content stream to the display of the VR headset worn by the viewer, the at least one of captions, text description, and quizzes presented at predetermined times during playback of the content stream to permit the viewer to interact in real-time with the content stream;

the interaction engine configured to provide user control, so that the viewer reacts to the content stream during the playback of the content stream in a streaming content phase, the viewer reacting including interacting with at least one virtual object depicted in the content stream, and provides output or commands to control operation of the interactive supplemental display output during the playback of the content stream;

providing data collection capability, using a data collection engine, to collect data during the playback of the content stream, based on viewer interaction in response to the supplemental display output provided to the viewer during playback of the content stream; and packaging, using a delivery engine, the content stream for playback on the display of the VR headset worn by the viewer.

12. The method according to claim 11, wherein inclusion in the content stream of the at least one prerecorded video file reduces computer processing time when creating the content stream.

13. The method according to claim 11, wherein a plurality of prerecorded video files originally recorded in a 360 degree are concatenated together along with a plurality of embedded multimedia files to form the content stream, wherein selected embedded multimedia files present captions, text description, and quizzes to the user during playback of the content stream on the display of the VR headset worn by the viewer.

14. The method according to claim 11, wherein inclusion of the prerecorded video files in the content stream reduces computer processing time required to render the content stream suitable for playback on the display of the VR headset.

15. The method according to claim 13, wherein multimedia files include at least one of a video clip, power point presentation, animation, image file, text file, and spreadsheet file.

16. The method according to claim 11, wherein the content stream is simultaneously presented to the VR headset display of a plurality of viewers, and wherein the viewers are located remotely in separate geographical areas.

17. The method according to claim 11, wherein the viewer controls at least one input device that permits the viewer to select and control objects displayed to the viewer on the display of the VR headset during playback of the content stream.

18. The method according to claim 17, wherein the at least one input device includes at least one of a VR glove, a VR laser pointer, and a VR mouse.

19. The method according to claim 11, wherein the data collection engine generates a report that indicates a level of competency by the viewer with respect to the educational learning environment and the content stream presented to the viewer.

\* \* \* \* \*